United States Patent [19]

Takahashi et al.

[11] Patent Number: 4,580,084
[45] Date of Patent: Apr. 1, 1986

[54] METHOD AND SYSTEM FOR CONTROLLING SPEED OF ELECTRIC MOTOR

[75] Inventors: Tadashi Takahashi; Kunio Miyashita, both of Hitachi; Hiroshi Hayashida, Mito; Shigeki Morinaga; Junshiro Inamura, both of Hitachi, all of Japan

[73] Assignee: Hitachi, Ltd., Tokyo, Japan

[21] Appl. No.: 396,877

[22] Filed: Jul. 9, 1982

[30] Foreign Application Priority Data

Jul. 10, 1981 [JP] Japan ................................ 56-107123
Aug. 3, 1981 [JP] Japan ................................ 56-120733
Sep. 4, 1981 [JP] Japan ................................ 56-138487

[51] Int. Cl.[4] .............................................. H02P 1/04
[52] U.S. Cl. .................................. 318/396; 318/397; 318/398
[58] Field of Search ............... 318/696, 314, 398, 397, 318/396, 609, 610, 317, 325, 327, 329.

[56] References Cited

U.S. PATENT DOCUMENTS

| 3,309,597 | 3/1967 | Gabor et al. | 318/396 X |
| 3,599,063 | 8/1971 | Nanai et al. | 318/398 X |
| 3,836,833 | 9/1974 | Harris et al. | 318/398 X |
| 3,917,989 | 11/1975 | Bereisa, Jr. | 318/398 X |
| 4,109,190 | 8/1978 | McNaughton | 318/609 |
| 4,218,735 | 8/1980 | McCutcheon | 318/329 |

OTHER PUBLICATIONS

Polk, "Algorithm for Implementing PID . . . ", IBM Tech. Disclosure Bulletin, vol. 23, No. 8, Jan. 1981, pp. 3514-3516.
Olivier et al., "Digitally Controlled Thyristor . . . ", IEEE Elect. and Contr. Instu., vol. IECI-26, No. 3, Aug. 1979, pp. 185-191.
Cohn et al., "A Step by Step Introduction to 8080 . . . ", Dilithium Press, Forest Grove, Oregon, 97116, 1977, pp. 1-4.

Primary Examiner—Ulysses Weldon
Attorney, Agent, or Firm—Antonelli, Terry & Wands

[57] ABSTRACT

A motor speed control method and system allow the motor to be accelerated to the steady state in the minimum time even under conditions of varying load torque, varying load inertia and varying power voltage. The motor is controlled by a voltage including a component of proportional term which is a function of a difference between a command speed and a detected speed, and a component of integral term which is summed during an acceleration phase. The acceleration of the motor during the starting process is measured and the integral term is modified basing on the result. The integral term may be memorized so that it is used as the integral term when the subsequent starting phase is completed. The integral term may be obtained from the acceleration and deceleration in the starting process.

22 Claims, 17 Drawing Figures

METHOD AND SYSTEM FOR CONTROLLING SPEED OF ELECTRIC MOTOR

BACKGROUND OF THE INVENTION

The present invention relates to a method and system for controlling speed of an electric motor and, more particularly, to a method and system for controlling the speed of an electric motor which has a tachometer generator, such as a rotary encoder, for measuring the rotational speed of the motor output shaft, and runs at a specified speed under the voltage supplied through switching devices.

A proportional control has been commonly practiced for controlling a rotational speed of a DC motor accurately, wherein a tachometer generator, such as a rotary encoder, is provided within the motor or on the drive shaft of the motor and the output of the tachometer is fed back so that the motor runs at a constant speed. In this method, however, a difference between a command speed and an actual speed detected by the tachometer generator, such as the rotary encoder, is fed back, and the difference cannot be reduced to zero, resulting in a permanent error in the motor speed. According to a known method for eliminating the above-mentioned speed error, a proportional control is carried out by which a feedback in proportion to the difference between the command speed and the actual motor speed is made, as well as carrying out an integration control which carries out a feedback in accordance with the result of integration of the above-mentioned difference.

Recently, DC motors are often loaded by information handling devices which render various moment of inertia and frictional torque to the motor shaft. In the conventional system, each loading device directly coupled to the motor and a control loop gain and integration parameters are adjusted so as to obtain satisfactory start-up characteristics without causing overshooting and undershooting. Further, if a power voltage to the motor varies, that is effectively identical to variation of the control loop gain. Thus, the gain needs to be readjusted, or a circuit which automatically control the gain in accordance with the power voltage needs to be added.

SUMMARY OF THE INVENTION

It is an object of the present invention to provide a method and system for controlling the speed of an electric motor wherein the motor can be accelerated to the specified speed in a minimum possible time without overshooting and hunting even under conditions of varying load torque, varying load inertia and varying power voltage.

For a feedback motor speed control in which the voltage applied to the motor consists of a proportional term voltage component based on the difference between the command speed and the detected motor speed and an integral term voltage component which is obtained by integrating a component during the acceleration of the motor, the present invention resides in that the integral term is modified in accordance with an acceleration of the motor measured during the start-up period.

A modified value of the integral term or a value of the integral term during a steady running state without modification of the integral term may be memorized so that it can be used as the integral term when the proportional term becomes zero in the subsequent start-up processes.

Moreover, the deceleration of the motor may be measured in addition to the acceleration during the start-up period so that the integral term is modified in accordance with both the acceleration and deceleration of the motor.

DESCRIPTION OF THE PREFERRED EMBODIMENTS

Before explaining the specific embodiments of the present invention, the fundamental technical theory and the point of the invention will first be described for convenience sake of clear understanding. The discussion begins with matters related to the speed control.

First, (a) the command speed Nc is given. This is the reference value for the motor to run at a specified speed.

Next, (b) the motor speed N is obtained through a tachometer generator, such as a rotary encoder, for detecting the rotational speed of the motor shaft.

Further, (c) there is a voltage component corresponding to the load torque and the counter electromotive force, e=K.N (K:constant), of the motor.

The motor drive voltage Vout is expressed in terms of the above parameters as follows.

$$V_{out} = G_1(N_c - N) + \Sigma ke \quad (1)$$

In equation (1), the first term of the right side is called "proportional term", which dominates the motor drive voltage Vout during the acceleration phase when the motor speed N largely differs from the command speed Nc, and is nullified when the motor speed N reaches the command speed Nc. $G_1$ is a constant of this term and it represents the gain of the system. Thus, during the start-up period, this term serves dominantly to accelerate the motor.

The second term of the right side is related to the integral term concerning the voltage component corresponding to the load torque and the counter electromotive force of the motor. This term is increasing with respect to time during the acceleration of the motor. Assuming the value of the integral term at time $t_{n-1}$ to be $\Sigma ke_{n-1}$, the immediate value $\Sigma ke_n$ is given as follows.

$$\Sigma ke_n = \Sigma ke_{n-1} + Kd \qquad (2)$$

where Kd is a value related (proportional) to value Nc-N.

In the foregoing system, the first term on the right side of equation (1) serves to produce the acceleration torque for the motor, and it is nullified when the motor runs in the steady state. The second term relates to the load torque and the counter electromotive force of the motor as mentioned above, and it is integrated during the acceleration phase, while it takes a constant value $\Sigma ke_1$ when the motor runs at a constant speed.

Consequently, if the value of $\Sigma ke$ is equal to the value of $\Sigma ke_1$ at the end of the acceleration, the motor speed enters the steady state immediately.

With the electromotive force constant of the DC motor being of Kn (V/RPM), motor speed at the steady state of $N_1$ (RPM), the motor armature resistance of R ($\Omega$), the load torque of Tl (kg-m), and the torque constant of Kt (kg-m/A), the motor drive voltage at the steady state speed, Vt, is given as follows.

$$V_t = Kn \cdot N_1 + (R \times Tl)/Kt \qquad (3)$$

Here, an assumption is made that Kd which varies in proportion to (Nc-N) takes a constant value $Kd_1$. With equation (2) given the condition $Kd = Kd_1$ and the acceleration time given $t_1$, the integral term of equation (1) at the end of the acceleration phase is expressed as follows.

$$\Sigma ke = Kd_1 \times t_1 \qquad (4)$$

In order that the motor is accelerated to reach the steady state speed in a minimum possible time, it is necessary that the value of equation (3) is equal to the value of equation (4) when the steady state speed is reached. This condition is expressed as follows.

$$Kn \cdot N_1 + (R \times Tl)/Kt = Kd_1 \times t_1 \qquad (5)$$

Reforming the equation using the acceleration $\alpha_1$ gives $$Kn \cdot N_1 + (R \times Tl)/Kt = Kd_1 \times (N_1/\alpha_1) \qquad (6)$$

Solving the equation (6) for $Kd_1$ gives $$Kd_1 = \alpha_1 \{Kn + (R \times Tl)/N_1 \cdot Kt\} \qquad (7)$$

For the constant acceleration starting, the acceleration is equal to $\alpha_1$, and $Kd_1$ related to the integral term of equation (4) is determined by giving the values of the measured acceleration $\alpha_1$ and the motor speed N measured at an instant during the starting in equation (7) and by knowing the load torque Tl.

The acceleration of a motor is generally expressed in the following equation.

$$\alpha = \frac{T_M - T_L}{J_M - J_L} = \frac{T}{J} \qquad (8)$$

where $T_M$ is the drive torque of the motor, $T_L$ the load torque, $J_M$ the moment of inertia of the motor, and $J_L$ is the moment of inertia of the load.

In motor speed control, a variation in the load inertia can be expressed as a variation of the acceleration of the motor. Accordingly, by measuring the motor acceleration $\alpha$ and calculating the value of $Kd_1$ on the value of $\alpha$, the motor speed can be controlled for the varying load inertia.

In general, electric motors for driving information handling devices are mostly permanent magnet motors having a small load torque Tl relative to a large load inertia. In such cases, it is merely necessary to consider the term for the counter electromotive force, i.e., the first term on the left side of equation (6), for the steady state, and $Kd_1$ is given as follows.

$$Kd_1 = \alpha_1 \cdot Kn \qquad (9)$$

The simplest way to take account of the load in motor speed control is to start the motor while measuring the acceleration $\alpha_1$ during the acceleration phase so as to modify Kd in the integral term of equation (1) to $Kd_1$ as obtained in equation (9). As a result, the motor can be started stably in a minimum time, and the motor speed N will soon reach the steady state $N_1$ where the value $\Sigma ke$ of the integral term becomes equal to the value $\Sigma ke_1$ for the counter electromotive force in the steady state.

Figure 1:
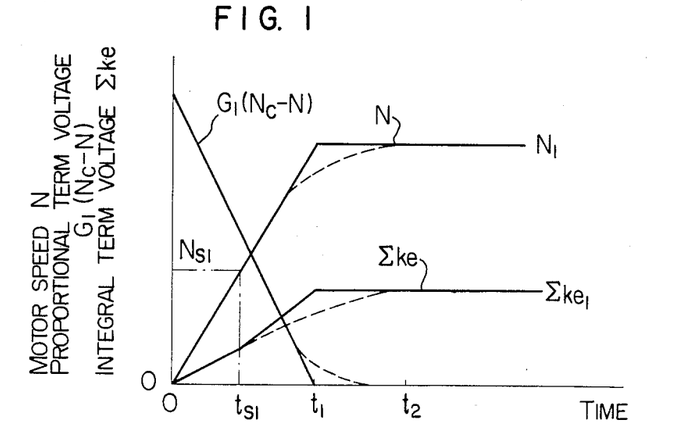
FIGS. 1 and 2 are graphical representations showing the motor start-up characteristics according to the speed control method embodying the present invention.

The process will be described in connection with FIG. 1. FIG. 1 shows the motor start-up characteristics, where the dashed lines represent the responses without modification for Kd in the integral term, while the solid lines represent responses with the modification. FIG. 1 shows an example where the motor speed rises much faster due to the decreasing load inertia or the increasing power voltage. That is, in the case without modification for Kd as shown by the dashed lines, when the motor speed N approaches the steady state, causing the proportional term $G_1(N_1-N)$ to decrease, the integral term $\Sigma ke$ does not reach the steady state $\Sigma_1$, and thus the motor speed N does not reach the steady state until $t_2$ when the integral term enters the steady state.

On the other hand, in the method with modification for Kd in the integral term as shown by the solid lines, acceleration $\alpha_1$ can be obtained from the motor speed $N_{S1}$ that is reached at time $t_{S1}$, as $\alpha_1 = N_{S1}/t_{S1}$. The time $t_{S1}$ is chosen sufficiently small and the value of Kd is modified to $Kd_1$ at $t_{S1}$ so that the slope of $\Sigma ke$ is modified as shown by the solid line. In this process, when the motor speed N has reached the steady state $N_1$, the value of $\Sigma ke$ also reaches the steady state $\Sigma ke_1$, bringing the proportional term $G_1(N_1-N)$ to zero, whereby the motor speed enters the steady state smoothly. Consequently, the motor start-up time can be reduced significantly from $t_2$ for the case without modification to $t_1$.

Figure 2:
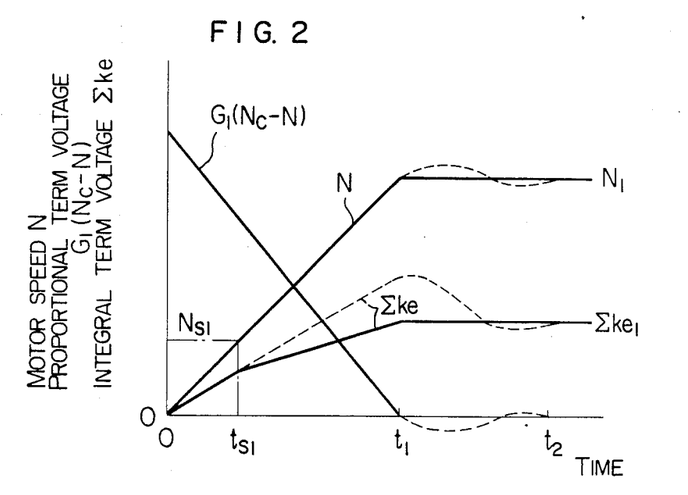

FIG. 2 shows another example of the motor startup characteristics, where the start-up time extends due to the increasing load inertia or the decreasing power voltage. In this case, the integral term $\Sigma ke$ without modification for Kd at a time when the motor speed has reached the steady state $N_1$ becomes larger than the steady state value $\Sigma ke_1$. The motor speed N overshoots the steady state $N_1$, causing the integral term to decrease, next the integral term undershoots the steady state $\Sigma ke_1$ when the motor speed N falls below the steady state $N_1$, and finally the steady state values are reached at $t_2$.

In the method with modification for Kd of the integral term as shown by the solid lines in FIG. 2, the acceleration $\alpha_1$ can be determined from a speed variation $N_{S1}$ gained in time $t_{S1}$, and the integral term $\Sigma ke$ reaches the steady state $\Sigma ke_1$ at $t_1$ when the motor speed has reached the steady state $N_1$, thus the motor speed enters the steady state $N_1$ without overshooting.

Thus, the motor can be started without hunting and in a short time by detecting the acceleration $\alpha_1$ in the start-up period and modifying the integral term depending on the $\alpha_1$. In the foregoing method, the acceleration of the motor can be determined either by measuring the variation of the motor speed in the unit time or by measuring the time in which the unit speed variation is produced.

Figure 3:
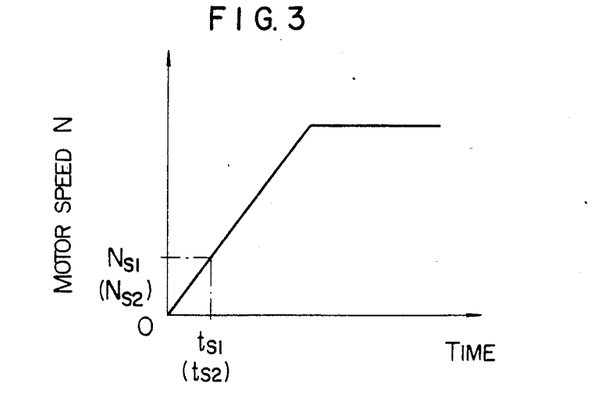
FIG. 3 is a graphical representation showing the acceleration detection characteristics according to the invention.

FIG. 3 shows the motor speed vs. time characteristics. In the first-mentioned method, the acceleration $\alpha_1$ is obtained basing on the measurement of the motor speed $N_{S1}$ at time $t_{S1}$ as follows.

$$\alpha_1 = N_{S1}/t_{S1} \qquad (10)$$

In the second-mentioned method, acceleration $\alpha_1$ is obtained basing on the measurement of time $t_{S2}$ in which the motor gains the unit speed $N_{S2}$ as follows.

$$\alpha_1 = N_{S2}/t_{S2} \qquad (11)$$

The obtained acceleration $\alpha_1$ is used in equation (8) to modify Kd for the integral term, and satisfactory speed control can be achieved even if system parameters such as the load inertia vary.

The following will describe embodiments of the inventive motor speed control method together with embodiments of the inventive motor speed control apparatus with reference to the drawings.

Figure 4:
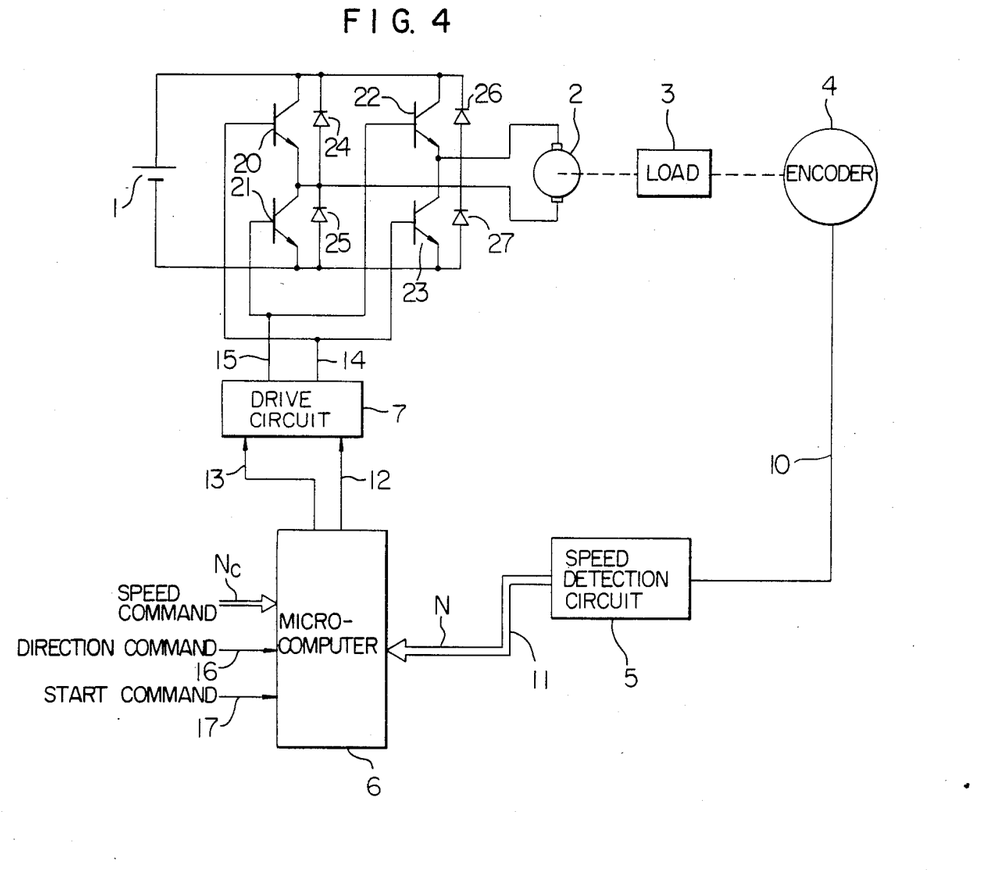
FIG. 4 is a schematic illustration showing the speed control system embodying the invention.
Figure 5:
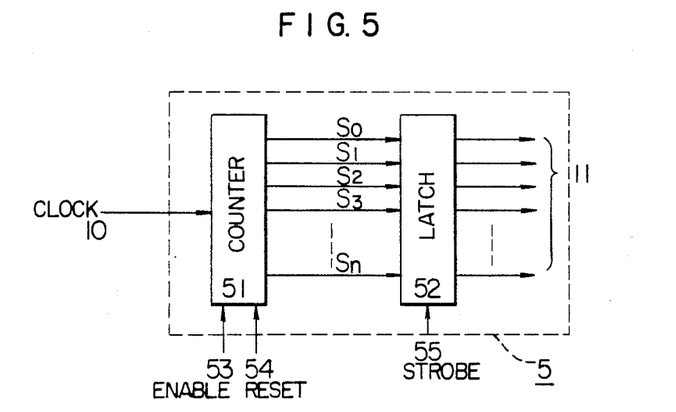
FIG. 5 is a schematic diagram exemplifying the speed detection circuit.
Figure 6:
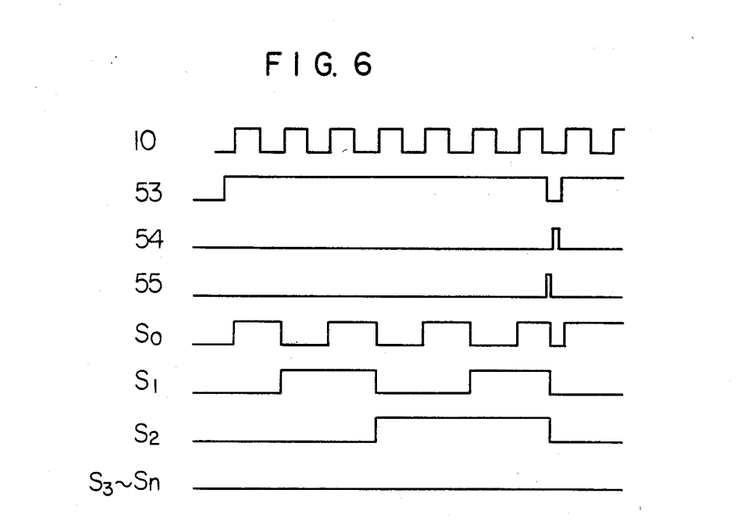
FIG. 6 is a waveform diagram showing the operation of the speed detection circuit.
Figure 7:
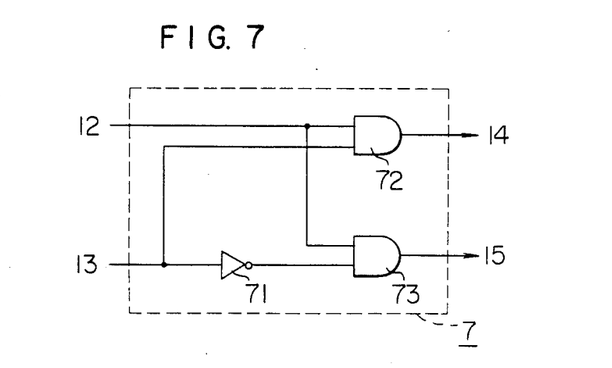
FIG. 7 is a schematic diagram exemplifying the drive circuit.
Figure 8:
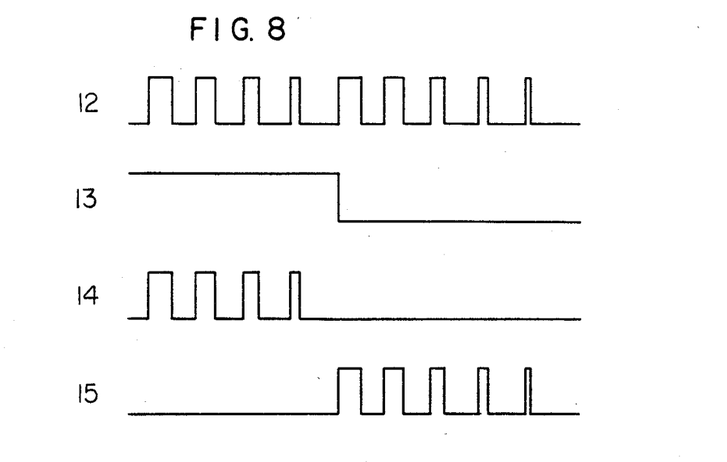
FIG. 8 is a waveform diagram showing the operation of the drive circuit.
Figure 9:
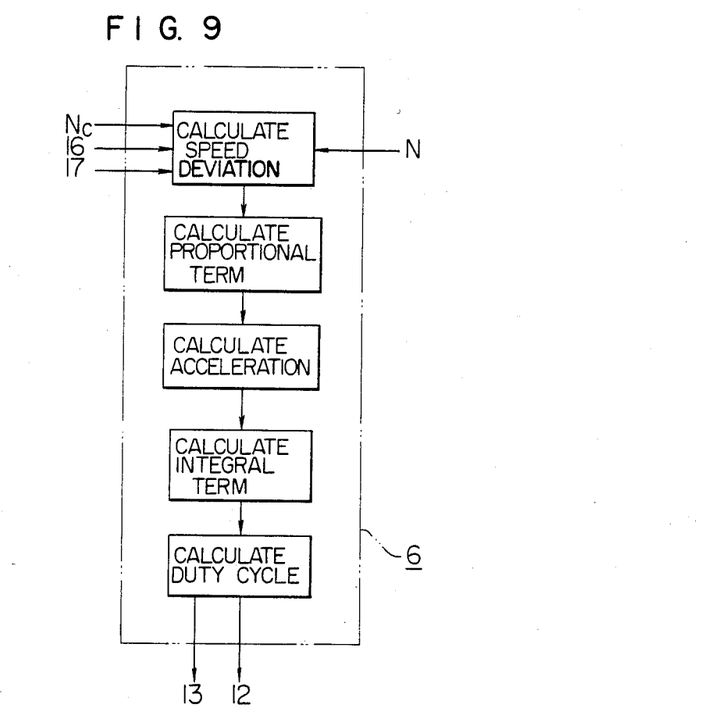
FIG. 9 is a block diagram explaining the operation of the microcomputer.
Figure 10:
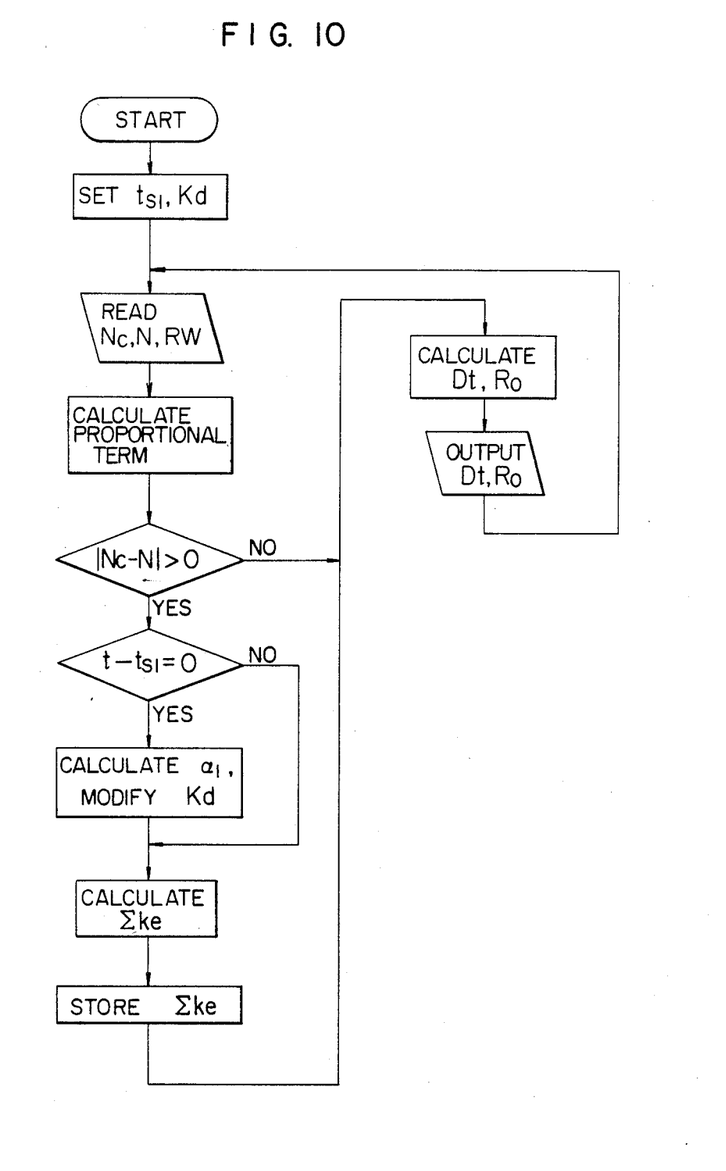
FIG. 10 is a flowchart for carrying out the processes of the speed control method embodying the invention.

FIG. 4 shows the arrangement of the speed control system embodying the invention, FIG. 5 shows the arrangement of the speed detection circuit used in the system, FIG. 6 is a timing chart explaining the operation of the speed detection circuit, FIG. 7 shows the arrangement of the drive circuit used in the system, FIG. 8 is a timing chart explaining the operation of the drive circuit, FIG. 9 is an operational block diagram of the microcomputer used in the system, and FIG. 10 is a flowchart for carrying out the processes of the speed control method embodying the present invention.

First, referring to FIG. 4, the motor speed control system includes a power source 1, an electric motor 2, an inertial load 3, a tachometer encoder 4, a speed detection circuit 5, a microcomputer 6, and a drive circuit 7. Signals observed in the system include the rotation signal 10 generated by the encoder 4, the speed signal (corresponding to the motor speed N) produced by the speed detection circuit 5, the duty signal 12, the direction signal 13, the forward output 14, the backward output 15, the direction command 16, the start command 17, and the speed command Nc which has been mentioned previously.

The system further includes transistors 20–23 and diodes 24–27, which constitute a transistor bridge and a diode bridge, respectively, connected across the power source 1. In more detail, the positive terminal of the power source 1 is connected to the collector of the transistors 20 and 22 and to the cathode of the diodes 24 and 26, while the negative terminal of the power source 1 is connected to the emitter of the transistors 21 and 23 and to the anode of the diodes 25 and 27. The emitter of the transistor 20, the collector of the transistor 21, the anode of the diode 24 and the cathode of the diode 25 are together connected to one terminal of the motor 2, which has another terminal connected commonly to the emitter of the transistor 22, the collector of the transistor 23, the anode of the diode 26 and the cathode of the diode 27.

The motor 2 has a drive shaft coupled to the load 3 and to the encoder 4, which provides the rotation signal 10 for the speed detection circuit 5. The speed signal 11 (i.e., N) produced by the speed detection circuit 5 is delivered to the microcomputer 6, which further receives the speed command Nc, the direction command 16 and the start command 17 from the external circuitry.

The microcomputer 6 provides the duty signal 12 which gives the duty cycle for controlling the transistor bridge in chopping mode, and the direction signal 13 for specifying the forward or backward rotational direction of the motor 2. These outputs from the microcomputer 6 are supplied to the drive circuit 7. The forward output 14 from the drive circuit 7 is supplied to the base of the transistors 20 and 23, and the backward output 15 is supplied to the base of the transistors 21 and 22.

The operation of the foregoing arrangement is as follows.

Upon receipt of the speed command Nc, direction command 16 and start command 17, the microcomputer 6 fetches the motor speed N from the speed detection circuit 5 and compares it with the command speed Nc to calculate the value of the proportional term.

The microcomputer 6 calculates the integral term to determine the drive voltage Vout applied to the motor 2, and outputs the duty signal 12 for specifying the duty cycle of the voltage waveform. The microcomputer 6 further determines the rotational direction of the motor 2 and issues the direction signal 13. When the drive circuit 7 receives the forward direction signal, it makes the transistors 20 and 23 conductive in accordance with the duty signal 12, and the motor 2 rotates in the forward direction.

In the early phase of starting, the motor speed N is low, providing a large difference from the command speed Nc, and the value of the integral term $\Sigma ke$ is also sufficiently small, causing the duty signal 12 to be determined by the term $G_1(Nc-N)$ in equation (1). Thus the motor 2 is accelerated in response to the duty signal having a long ON period. As the motor speed approaches the command speed Nc, the value of $G_1(Nc-N)$ decreases, while the value of the integral term $\Sigma ke$ increases. The motor speed N reaches the command speed Nc when the starting phase completes. The integral term has been modified at time $t_{S1}$ so that the value of $\Sigma ke$ coincides with the steady state value $\Sigma ke_1$ at the end of the start-up phase, and thus the motor speed reaches the steady state $N_1$ smoothly.

Next, each of the circuit blocks will be described in more detail.

The speed detection circuit 5 is arranged, for example, using a counter 51 and a latch 52 as shown in FIG. 5. The counter 51 receives at its clock input the rotation signal 10 from the rotary encoder 4, the enable signal 53 having a certain duration at its enable terminal, and the reset signal 54 at its reset terminal. The counter 51 has outputs So-Sn delivered to the inputs of the latch 52, which provides the speed signal 11 representing the motor speed N. The latch 52 also receives the strobe signal 55.

In operation, while the enable signal 53 is active, the counter 51 counts the rotation signal 10 and provides the outputs So-Sn as shown in the timing chart of FIG. 6. Subsequently, the signals So-Sn are latched in the latch 52 in response to the strobe signal 55, then the counter 51 is cleared by the reset signal 54. Accordingly, the circuit counts the rotation signal 10 for a certain length of time defined by the enable signal 53, thereby providing the speed signal which is directly proportional to the motor speed N.

The drive circuit 7 is made up of an inverter 71 and AND gates 72 and 73 as shown in FIG. 7. The AND gates 72 and 73 have one input receiving the duty signal 12, while another input of the AND gate 72 receives the direction signal 13 and another input of the AND gate 73 receives the same signal 13 via the inverter 71. In this arrangement, the AND gate 72 outputs the duty signal 12 only when the direction signal 13 is at "1" level as shown in FIG. 8, and this signal is the forward output 14. Similarly, the AND gate 73 outputs the duty signal 12 only when the direction signal 13 is at "0" level, and this signal is the backward output 15.

The microcomputer 6 includes a central processing unit (CPU), a random access memory (RAM), a read only memory (ROM), and input/output ports, and operates in accordance with the program stored in the ROM.

FIG. 9 shows the operational block diagram of the microcomputer 6. The microcomputer 6 receives the speed command Nc, start command 17 and direction command 16 from the external circuitry, and compares the motor speed N with the command speed Nc. The computer calculates the proportional term $G_1(Nc-N)$ in equation (1), and then calculates the acceleration basing on the motor speed gained in a certain time period. Next, the computer calculates the integral term of the equation and the duty cycle of the voltage waveform. Finally, the microcomputer 6 determines the rotational direction, and outputs the duty signal 12 and direction signal 13.

The operation of the microcomputer program according to the present invention will be described with reference to the flowchart of FIG. 10. Initially, upon receipt of the start command 17 shown in FIG. 4, the microcomputer 6 starts the program. First, the reference time period (unit time) $t_{S1}$ for measuring the acceleration $\alpha_1$ and the value of Kd for the integral term of equation (1) are set. Next, the speed command Nc, motor speed N and direction command Rw 16 are read in, and the proportional term of equation (1) is calculated. The difference between the motor speed N and the command Nc is checked to determine if the motor speed N has reached the steady state $N_1$. If the motor speed is equal to $N_1$, the integral term $\Sigma ke$ is left unchanged, and the corresponding duty cycle Dt and direction signal Ro are outputted. Then, the speed command Nc, motor speed N and direction command Rw are read in and the same processes are repeated. On the other hand, if the motor speed N is not equal to the command Nc, it is checked whether the elapsing time since the program was started, coincides with the preset time period $t_{S1}$. If this condition is met, the acceleration $\alpha_1$ is calculated from the motor speed $N_{S1}$ at that time, and Kd is modified basing on the $\alpha_1$. If the elapsing time does not coincide with the preset time, the processes for calculating the acceleration $\alpha_1$ and modifying the Kd are skipped.

Subsequently, the integral term $\Sigma ke$ is calculated according to the equation (2), and the result is stored in the RAM so that it is used in the subsequent calculation for the duty cycle Dt of the chopping operation and determination of the rotational direction Ro. Finally, the duty signal 12 and direction signal 13 are outputted, and the program returns to the entry of input data. These processes are repeated until the motor speed N reaches the command speed Nc.

According to the foregoing embodiment of the invention, the acceleration $\alpha_1$ is calculated basing on the operation data at starting so as to provide the integral term corresponding to the counter electromotive force in the steady state of the motor operation, thereby accomplishing the speed control method and apparatus which allow stable starting of the motor in the minimum time under conditions of varying load inertia and varying power voltage.

The following will describe another embodiment of the speed control method, wherein the start-up time is reduced without carrying out the modification calculation at each starting.

Initially, in a first starting phase, the calculation for modifying the integral term $\Sigma ke$ as described in connection with FIGS. 1 and 2 is carried out. The values of the integral term $\Sigma ke_1$ and $Kd_1$ at time $t_1$ when the motor speed N is equal to the command speed Nc are memorized. When the motor once stops and then restarts, it is unnecessary to measure the acceleration for modifying the integral term $\Sigma ke$, but the integral term $\Sigma ke$ is obtained by the integration of Kd, which has been used in the first starting, until the next start-up phase completes.

In another example, an integral term $\Sigma ke$ is compared with the previous integral term stored, and the value of Kd is modified depending on the difference. The modified Kd is memorized for use in the subsequent starting of the motor. For example, if the load inertia has increased, causing the start-up time to extend, resulting in a larger integral term $\Sigma ke$ than the stored one, the excessive Kd is reduced and the reduced Kd is stored for use in the subsequent start-up processes. Thus, the start-up time approaches the minimum as the number of starting operations increases.

Figure 11:
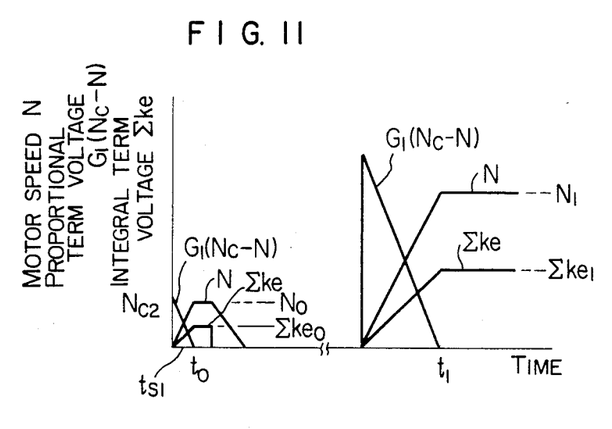
FIG. 11 is a graphical representation showing the motor start-up characteristics according to another embodiment of the speed control method of the present invention.

In a preliminary or trial starting as shown in FIG. 11, the command speed No is given lower than the steady state speed $N_1$ and the value of $Kd_1$ obtained in the starting process is memorized, and this value is used for the subsequent start-up operations aiming at the steady state speed $N_1$.

The operation will further be described with reference to the start-up characteristics shown in FIG. 11, where the first (preliminary) starting is shown by (a) and the second starting is shown by (b). For the first starting of the motor following the power-ON procedure, a speed command No which is far lower than the steady state speed $N_1$ is given. Also in this start-up operation, the acceleration $\alpha_1$ is measured for modifying Kd as shown in FIGS. 1 and 2, and the modified $Kd_1$ is memorized. In the second start-up operation, the stored $Kd_1$ is used for calculating the integral term $\Sigma ke$.

Figure 12:
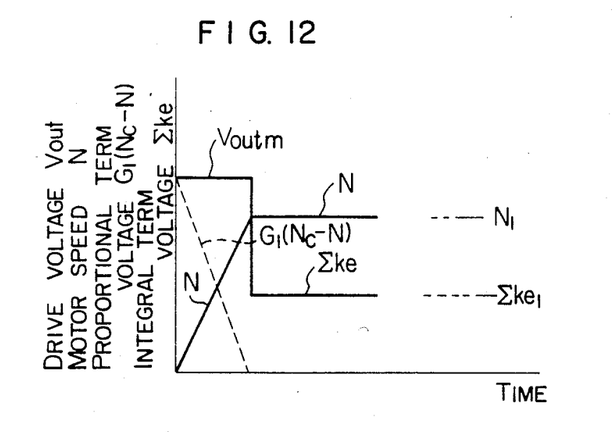
FIG. 12 is a graphical representation showing the motor start-up characteristics according to still another embodiment of the invention.

In general, a motor drive circuit employs a current limiter so as to use semiconductor devices within the current rating, and thus the motor is started with a constant torque. Therefore, the motor speed N rises linearly, and when the integral term $\Sigma ke$ is calculated using the value of Kd which has been stored at the initial starting, it precisely reaches $\Sigma ke_1$ at time $t_1$ when the start-up phase completes. The motor drive voltage Vout is maintained maximum until the motor speed N becomes equal to the command Nc, and at this critical point the drive voltage Vout is switched to the $\Sigma ke_1$ which has been stored on completion of the first start-up operation as mentioned in FIGS. 1 and 2, whereby the motor can be started in the minimum time without the need of integration by using Kd. FIG. 12 shows the start-up characteristics for the above-mentioned second start-up operation. As can be seen in the figure, the start-up drive voltage Vout does not comply with equation (1), but it is given the maximum voltage $Vout_m$ until the value of Nc-N falls to zero. When the value of Nc-N goes zero, i.e., this means the completion of the start-up phase, the drive voltage Vout is changed to the $\Sigma ke_1$ which has been obtained in the first start-up process. In case the integral term $\Sigma ke_0$ for the first starting aiming at the lower speed No (i.e., the final value of the integral term in the preliminary start-up process) as shown in FIG. 11 is used in this method, the $\Sigma ke$ is obtained by the following equation.

$$\Sigma ke = \Sigma ke_0 \times (N_1 / No) \qquad (12)$$

It will further be appreciated in this method that the value of $\Sigma ke_1$ in the steady state, which has been attained by the start-up process without modifying Kd as shown by the dashed lines in FIGS. 1 and 2, is memorized, and this value is used after the steady state is reached in the second and the following start-up processes.

The above embodiment of motor speed control will be described with reference to the flowchart of FIG. 13.

Initially, when power is turned on, the program starts. First, the reference time period (unit time) $t_{S1}$ for measuring the acceleration $\alpha_1$ and the value of Kd for the integral term of equation (1) are set. Next, the speed command Nc, motor speed N and direction command Rw 16 are read in, and a sufficiently small speed command $Nc_2$ is set. Then, the proportional term of equation (1) is calculated. The difference between the motor speed N and the above-mentioned preliminary speed command $Nc_2$ is checked to determine if the motor speed N has reached the command speed $Nc_2$. If the motor speed N has not yet reached the command speed $Nc_2$, it is checked whether the elapsing time since the start-up process began coincides with the preset time $t_{S1}$, and if this timing is true, the acceleration $\alpha_1$ is calculated from the motor speed $NS_1$ at that time and Kd is modified. If the timing condition is not met, the processes for calculating the acceleration $\alpha_1$ and modifying Kd are skipped.

Subsequently, the integral term $\Sigma ke$ is calculated according to equation (2), and the result is stored in the RAM so that it is used in the subsequent calculation for the duty cycle Dt of the chopping operation and determination of the rotational direction Ro. Finally, the duty signal 12 and direction signal 13 are outputted, and the program returns to the entry of input data. These processes are repeated, and when the motor speed N has reached the command speed $Nc_2$, the values of Kd and integral term $\Sigma ke_0$ are memorized. Then, the duty cycle Dt of the chopping operation is made zero to stop the motor. After the motor has stopped, the program proceeds to the top of the blocks enclosed by the dot-and-dashed line A in FIG. 13.

In this section of the program, the presence of the start command 17 shown in FIG. 4 is first checked, and when the start command 17 is present, the speed command Nc, motor speed N and direction command Rw are read in, then the proportional term of equation (1) is calculated. The difference between the motor speed N and the command Nc is checked to determine if the motor speed N has reached the steady state $N_1$. If the motor speed has not yet reached $N_1$, the integral term $\Sigma ke$ is calculated basing on the value of Kd which has been stored previously, then the new value of $\Sigma ke$ is memorized.

Next, the duty signal 12 for the chopping operation and the direction signal 13 are calculated and outputted. The program returns to the checking of the start command 17, and if it still exists, the above processes are repeated to continue the start-up operation.

When the motor speed N reaches the steady state $N_1$, the start-up phase completes. Then, equation (2) is calculated and the value of $\Sigma ke_1$ is memorized. Subsequently, the duty signal 12 for the chopping operation and the direction signal 13 are calculated and then outputted. Finally, the program returns to the checking for the start command 17. If the start command 17 is absent, the duty signal Dt is made zero and it is outputted to stop the motor. When the motor is started next, the same procedures as described above will be followed.

Figure 13:
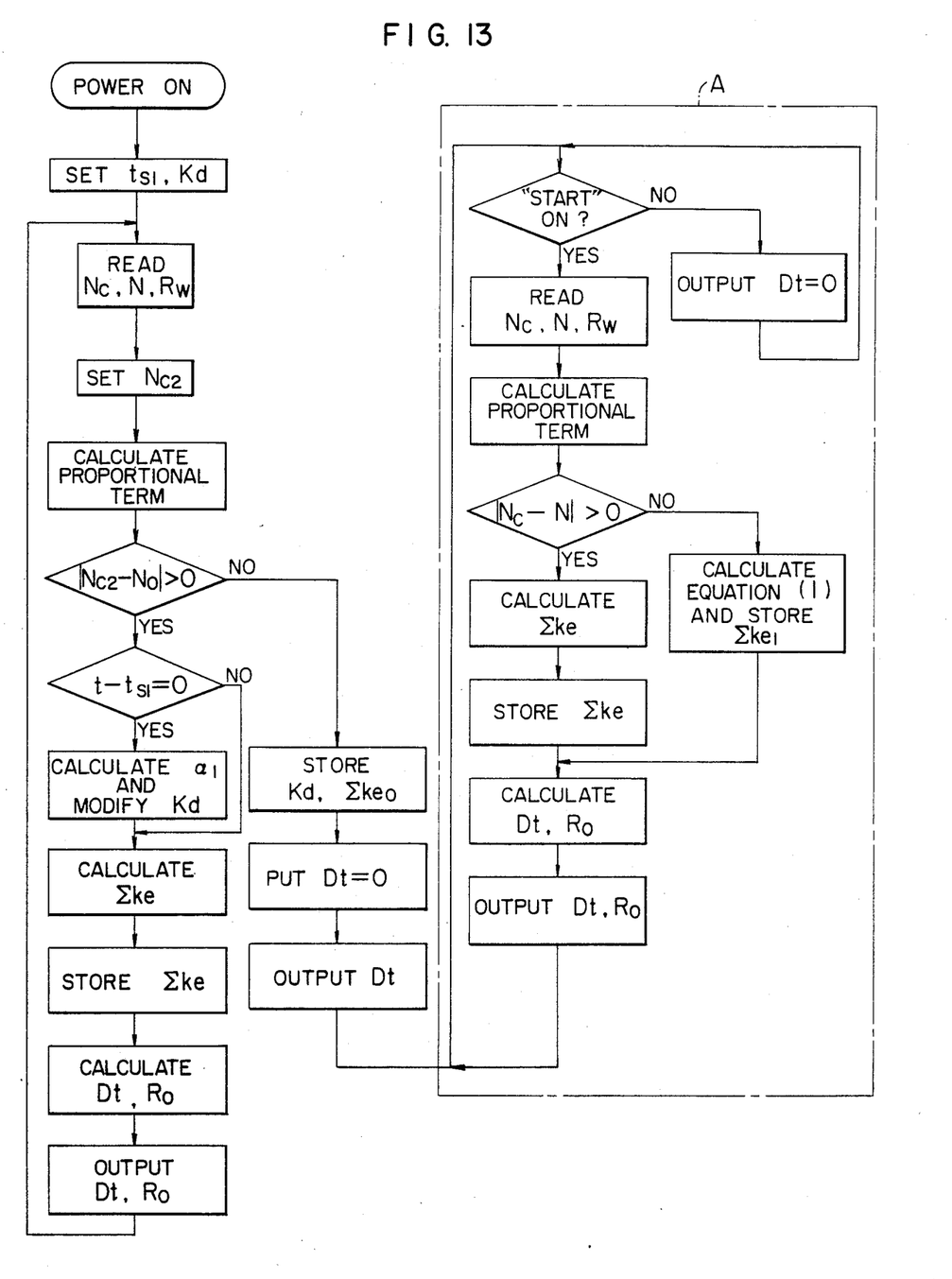
FIG. 13 is a flowchart for carrying out the process of the method shown in FIG. 11.
Figure 14:
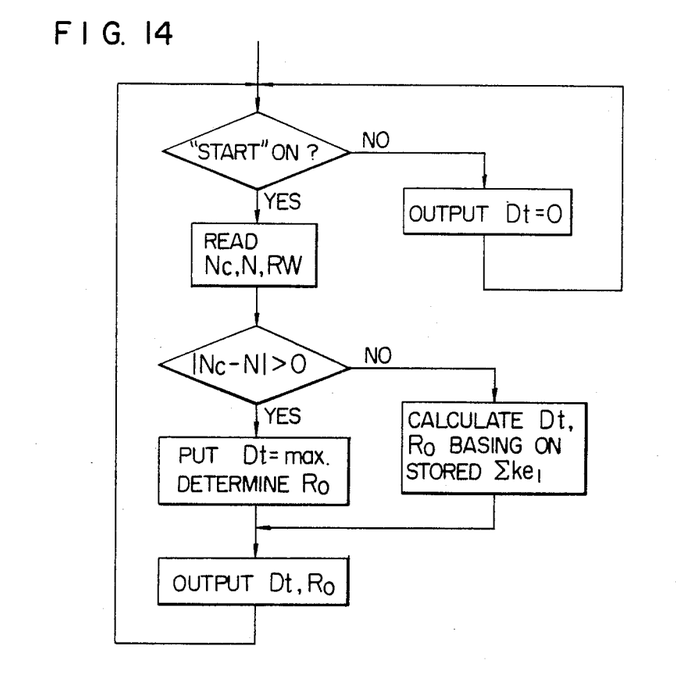
FIG. 14 is a flowchart for carrying out the process of the method shown in FIG. 12.

The first start-up operation after power has been turned on is carried out in the same way as shown in FIG. 13. Another embodiment of the method of the second and following start-up operations, corresponding to the blocks enclosed by the dot-and-dashed line A in FIG. 13, will be described with reference to the flowchart of FIG. 14. First, the presence of the start command 17 is checked, and if this signal is present, the speed command Nc, motor speed N and direction command Rw are read in. Next, the difference between the motor speed N and the command speed Nc is checked to determine if the motor start-up phase has completed. If the motor speed N has not yet reached the command speed Nc, the duty cycle Dt for the chopping operation is made maximum and the direction signal Ro is determined, and these signals are outputted. Then, the program returns to the top and checks the presence of the start command 17. If the signal exists, the above processes are repeated, and the motor speed N will increase. When the motor speed N reaches the command speed Nc to complete the start-up phase, the duty cycle Dt is calculated using the stored value of $\Sigma ke_1$ and the result is outputted. The program returns to the checking for the start command signal 17. If the signal is found absent, the duty cycle Dt is made zero and it is outputted to stop the motor.

The following will describe an example of motor speed control wherein the acceleration and deceleration of the motor during the start-up period are measured so as to modify the integral term of the equation. In the previous discussion, the second term on the left side of equation (6) could be neglected due to a small load torque Tl, resulting in the equation (9). In equation (8), however, if the load torque is large relative to the overall inertia J, the load torque Tl cannot be neglected, and therefore it is difficult to start the motor stably in the minimum time by way of the foregoing method. According to the method as described below, the load torque Tl is measured and the motor is decelerated in a certain short period in the start-up phase, and consequently the motor can be started stably in the minimum time.

When the motor is deenergized while it is running at a certain speed, the motor speed will fall due to the load torque Tl. The deceleration $\alpha_2$ of the motor is given:

$$\alpha_2 = \frac{-Tl}{J} \qquad (13)$$

where J is the overall inertia.

Similarly, the acceleration $\alpha_1$ of the motor, as shown by equation (8), is given:

$$\alpha_1 = \frac{T_M - Tl}{J} \qquad (14)$$

Combining the equations (13) and (14) gives $$Tl = \frac{-\alpha_2}{\alpha_1 - \alpha_2} T_M \qquad (15)$$

The motor output torque $T_M$ is expressed by the motor current I as:

$$T_M = Kt \times I \qquad (16)$$

Using this relation in equation (7) gives $$Kd_1 = \alpha_1 \left( Kn - \frac{\alpha_2}{\alpha_1 - \alpha_2} \times \frac{RI}{N} \right) \qquad (17)$$

The above equation indicates that the varying load torque and inertia are manageable by the measurement of the acceleration $\alpha_1$ and deceleration $\alpha_2$ and the calculation of $Kd_1$ in accordance with these values. In order to start the motor and bring the motor speed to the desired speed in the minimum time by introduction of load adaptation in speed control, the acceleration $\alpha_1$ and deceleration $\alpha_2$ are measured, and parameter Kd in the integral term of equation (1) is modified to $Kd_1$ in accordance with equation (17). Then, the start-up phase will complete stably, with the integral term $\Sigma$ke being equal to the value $\Sigma ke_1$ for the counter electromotive force in the steady state, and the motor speed N will reach the steady state $N_1$ in a short time.

Figure 15:
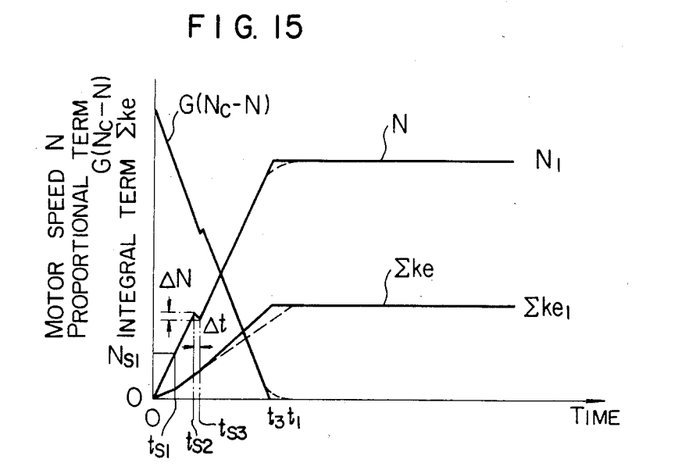
FIG. 15 is a graphical representation showing the motor start-up characteristics according to still another embodiment of the invention.

The process will be described in detail with reference to FIG. 15. In FIG. 15 the solid lines show the case where the modification of Kd is carried out according to equation (17), whereas the dashed lines show the case with modification by equation (9). In the case of equation (17), the motor speed $N_{S1}$ is measured at time $t_{S1}$, and the motor is deenergized for a period $\Delta t$ from $t_{S2}$ to $t_{S3}$ so as to determine the deceleration $\alpha_2$ by measuring the speed reduction $\Delta N$ in that period. Then, the integral term of the equation is modified by the calculation of equation (17) so that the characteristics shown by the solid lines are obtained. In this arrangement, when the motor speed N reaches the steady state $N_1$, the value of $\Sigma$ke also reaches the steady state $\Sigma ke_1$, causing the proportional term $G_1(Nc-N)$ to become zero, and thus the motor speed enters the steady state smoothly and the start-up time can be reduced from $t_1$ shown by the dashed line to $t_3$.

Another example for starting the motor in the minimum time will be described. Substituting equations (15) and (16) into equation (3) gives $$Vt = Kn \cdot N_1 - \frac{\alpha_2}{\alpha_1 - \alpha_2} IR \qquad (18)$$

Figure 16:
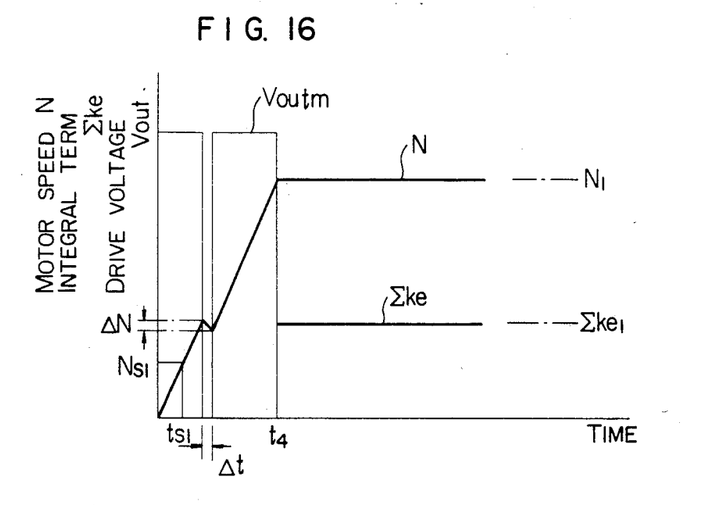
FIG. 16 is a graphical representation showing the motor start-up characteristics according to still another embodiment of the invention.

This equation gives the voltage necessary to run the motor at the steady state speed. Accordingly, the value of the integral term $\Sigma ke_1$ is directly given by the equation (18), and by assigning the value of equation (18) to $\Sigma ke_1$ when the motor speed N has reached the steady state $N_1$, the integrating operations accompanied for the modification of Kd in the start-up phase can be saved. This process is shown in FIG. 16, where the motor is started under the maximum drive voltage Vout and the acceleration $\alpha_1$ is measured at time $t_{S1}$. Then, the drive voltage Vout is nullified for a short period $\Delta t$ so as to measure the deceleration $\alpha_2$ in this period, and the steady state drive voltage Vt is calculated by equation (18) using $\alpha_1$ and $\alpha_2$. Once the motor speed N has reached the steady state $N_1$, the drive voltage Vout is nullified and the value of equation (18) is assigned to the integral term $\Sigma$ke. Thus, the start-up phase completes in the minimum time and the value of equation (18) is used as $\Sigma ke_1$.

Figure 17:
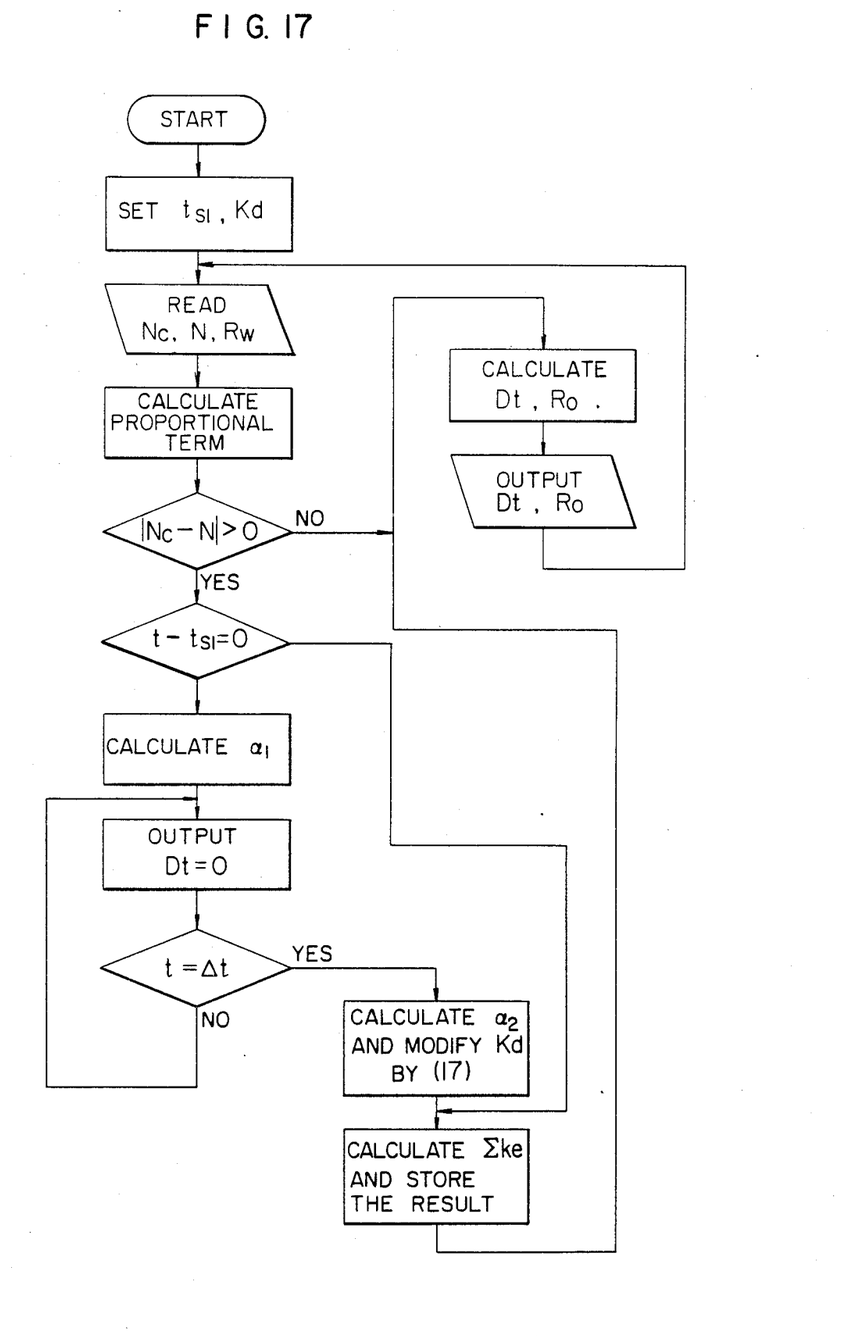
FIG. 17 is a flowchart explaining the operation of the speed control method shown in FIG. 15.

The operation of the embodiment shown in FIG. 15 will be described with reference to the flowchart of FIG. 17. The program starts upon receipt of the start command 17 shown in FIG. 4. First, the reference time period $t_{S1}$ for measuring the acceleration and the value of Kd for the integral term of equation (1) are set. Next, the speed command Nc, motor speed N and direction command Rw are read in, and the proportional term of equation (1) is calculated. The difference between the motor speed N and the command Nc is checked to determine if the motor speed N has reached the steady state $N_1$. If the motor speed N is found equal to $N_1$, the integral term $\Sigma$ke is left unchanged, and the corresponding duty cycle Dt and the direction signal Ro are outputted. Then, the speed command Nc, motor speed N and direction command Rw are read in and the same processes are repeated. On the other hand, if the motor speed N is not equal to the command Nc, it is checked whether the elapsing time, since the start-up process has started, coincides with the preset time $t_{S1}$. If this timing condition is met, the acceleration $\alpha_1$ is calculated from the then motor speed $N_{S1}$. If the elapsing time does not coincide with the preset time, the processes for calculating the acceleration $\alpha_1$ and modifying the Kd are skipped. Subsequently, the integral term $\Sigma$ke is calculated according to equation (2), and the result is memorized so that it is used in the subsequent calculations.

When the calculation of the acceleration $\alpha_1$ has completed, the duty cycle Dt is made to zero in order to measure the deceleration $\alpha_2$. After a certain time period $\Delta t$ has elapsed, the motor speed N is read in and the deceleration $\alpha_2$ in that period is calculated. Equation (17) is calculated, and Kd for the integral term is modified. Next, the $\Sigma$ke is calculated and the result is memorized, then the program proceeds to the calculation for the duty cycle Dt. When the start-up phase completes, the motor speed N becomes equal to the command speed Nc, and the acceleration $\alpha_1$ and deceleration $\alpha_2$ are not calculated any longer.

According to the foregoing embodiment, the motor is once deenergized during the start-up period, and hence it can be accelerated stably to the steady state speed with the minimum time. These processes allow the motor to start stably and in the minimum time even if the load torque and load inertia vary significantly.

In brief, according to the present invention, the electric motor can be accelerated to the steady speed state in the minimum start-up time without overshooting and undershooting even under conditions of varying load torque, varying load inertia, varying power voltage, and also variations in the motor characteristics depending on the temperature.

We claim:

1. A method for controlling the speed of an electric motor is operated by a voltage including a component of proportional term which is a function of a difference between a command motor speed and a detected motor speed and a component of integral term summed during an acceleration of said motor, comprising the steps of:
measuring the acceleration of said motor when said motor is started; and
modifying an integral gain of said integral term basing n the measured acceleration of said motor, said integral term including a component of the internal gain having one of a first and second fixed value and a component which is a function of the difference between the command speed and the detected motor speed, the component of the integral gain being modified from the first fixed value to the second fixed value in accordance with the measured acceleration of the motor.

2. A method for controlling the speed of an electric motor according to claim 1, wherein said integral term to be modified is expressed in terms of the measured acceleration $\alpha_1$ and the electromotive force constant $Kn$ of said motor as, $$Kd_1 = \alpha_1 \cdot Kn,$$

said $Kd_1$ being integrated with respect to time.

3. A method for controlling the speed of an electric motor according to claim 1, wherein said acceleration is calculated by measuring the variation of the motor speed in a predetermined unit time.

4. A method for controlling the speed of an electric motor according to claim 1, wherein said acceleration is calculated by measuring the elapsing time at which the motor speed reaches a predetermined speed.

5. A method for controlling the speed of an electric motor according to claim 1 further comprising the step of measuring the deceleration of said motor following or before the measurement of said acceleration in a start-up period so that said integral term is modified basing on said measured acceleration and deceleration of said motor.

6. A method for controlling the speed of an electric motor according to claim 1 further comprising the step of memorizing a modified integral term so that it is used as the integral term when said proportional term is zero in a subsequent starting.

7. A method for controlling the speed of an electric motor according to claim 1 or 5, wherein said modification for said integral term is carried out in an early phase of starting.

8. A method for controlling the speed of an electric motor according to claim 5 wherein said step of measuring the deceleration comprises the step of deenergizing said motor for a very short time for the purpose of measuring the deceleration of said motor.

9. A method for controlling the speed of an electric motor according to claim 5, wherein said integral term to be modified is expressed in terms of the measured acceleration $\alpha_1$, the measured deceleration $\alpha_2$, the electromotive force constant of the motor $Kn$, the armature resistance of the motor $R$, the motor current $I$, and the motor speed $N$, as $$Kd_1 = \alpha_1 \left( Kn - \frac{\alpha_2}{\alpha_1 - \alpha_2} \times \frac{RI}{N} \right)$$

said $Kd_1$ being integrated with respect to time.

10. A method for controlling the speed of an electric motor according to claim 6 further comprising, for the subsequent starting, the step of operating said motor by a maximum voltage until the motor speed reaches the command speed, and using said stored integral term as the integral term when the motor speed becomes equal to the command speed.

11. A method for controlling the speed of an electric motor according to claim 2 or 9 further comprising the step of memorizing a modified $Kd_1$ so that it is used as the integral term in a subsequent starting process.

12. A method for controlling the speed of an electric motor wherein said motor is operated by a supply voltage including a component of proportional term which is a function of a difference between the command motor speed and a detected motor speed and a component of an integral term summed during the acceleration of said motor, comprising the step of memorizing and storing the value of said integral term when the motor runs at a steady state, and the step of utilizing said stored integral term as an integral term in a subsequent starting proccess when said proportional term becomes zero in the subsequent starting process.

13. A method for controlling the speed of an electric motor according to claim 12 further comprising the steps of:
carrying out a preliminary starting with a command speed sufficiently lower than a steady state speed after power has been turned on;
calculating an integral term at the end of said preliminary starting;
calculating an integral term for the steady state speed basing on said calculated integration value in the subsequent starting process, the value of said calculated integral term for the steady state speed being memorized and stored so that it is used as the stored integral term in the steady state running following the subequent starting process.

14. A method for controlling the speed of an electric motor according to claim 6 or 12 further comprising the steps of:
measuring the acceleration of said motor in the subsequent starting process; and
calculating the start-up time basing on said measured acceleration so that the value of integral term obtained in said start-up time is equal to said stored value of the integral term.

15. A method for controlling the speed of an electric motor according to claim 13 wherein said integral term during a steady state running, $\Sigma ke$, is expressed in terms of a steady state speed $N_1$ and a steady state speed in a preliminary starting $No$ as:

$\Sigma ke = \Sigma ke_0 \times N_1/No$

16. A method for controlling the speed of an electric motor according to claim 12 further comprising, for the subsequent starting, the step of operating said motor by the maximum voltage until the motor speed reaches the command speed, said stored integral term being used as the integral term when the motor speed becomes equal to the command speed.

17. A system for controlling the speed of an electric motor including a means for detecting a rotational speed of said motor and a control circuit for applying a variable voltage, including a component of proportional term and a component of an integral term, to said motor, said control circuit comprising a microcomputer which calculates the acceleration of said motor basing on a motor speed signal provided by said speed detection means and modifies an integral gain of the integral term of said variable voltage using the calculated acceleration, the integral term including a component of the integral gain having one of a first and second fixed value and a component which is a function of a difference between a command speed signal and a detected motor speed signal, said microcomputer modifying the component of the integral gain from the first fixed value to the second fixed value in accordance with the calculated acceleration of the motor.

18. A system for controlling the speed of an electric motor according to claim 17, wherein said microcomputer calculates the deceleration of said motor and modifies said integral term of said variable voltage basing on said calculated acceleration and deceleration.

19. A system for controlling the speed of an electric motor according to claim 17 or 18, wherein said microcomputer memorizes said modified integral term so that it is specified as the integral term when said proportional term becomes zero in a subsequent starting.

20. A system for controlling the speed of an electric motor including a means for detecting a rotational speed of said motor and a control circuit for applying a variable voltage, including components of a proportional term and an integral term, to said motor, said control circuit comprising a microcomputer for memorizing a motor terminal voltage corresponding to the integral term when said motor runs at a steady state speed and for applying said memorized terminal voltage to said motor when the motor speed has reached said steady state in a subsequent starting process of said motor.

21. A system for controlling the speed of an electric motor according to claim 20, wherein said microcomputer memorizes the integral term when a preliminary starting has completed, calculates the integral term for the steady state speed of the subsequent starting, and memorizes said calculated integral term as a motor terminal voltage.

22. A system for controlling the speed of an electric motor according to claim 20, wherein said microcomputer specifies the maximum voltage to be applied to said motor until the motor speed reaches a command speed during the subsequent starting and specifies said memorized terminal voltage when the motor speed becomes equal to the command speed.

* * * * *